3,491,166
PEROXIDE TREATMENT OF HIGH INPACT RESIN COMPOSITIONS CONTAINING STYRENE-ACRYLONITRILE COPOLYMERS
Clifford W. Childers and Gerard Kraus, Bartlesville, Okla., assignors to Phillips Petroleum Company, a corporation of Delaware
No Drawing. Filed Dec. 8, 1966, Ser. No. 600,027
Int. Cl. C08f 41/10
U.S. Cl. 260—876          8 Claims

ABSTRACT OF THE DISCLOSURE

Resinous compositions having improved properties are provided by blending (1) a copolymer of a monovinyl substituted aromatic compound and acrylonitrile with (2) a rubbery block copolymer, said blend containing in addition an organic peroxy oxygen containing material. The resulting mixture is subjected to a temperature sufficient to decompose the peroxy oxygen containing material. Optionally, the blend may also contain a resinous block copolymer of a conjugated diene and a monovinyl substituted aromatic compound.

---

This invention relates to a new and improved method for making high impact resins and the compositions themselves. In one aspect this invention relates to high impact monovinyl substituted aromatic compound-acrylonitrile compositions with improved properties and the compositions thereof. In another aspect this invention relates to a method for making styrene-acrylonitrile copolymer compositions with other polymers having improved oil resistance and the compositions thereof.

Heretofore acrylonitrile - butadiene -styrene polymer compositions as well as styrene/acrylonitrile, butadiene/styrene copolymer mixtures have been disclosed.

It has now been found that resinous compositions having greatly improved oil or similar chemical resistance as well as high tensile strength, high elongation, and high impact strength are provided when a copolymer of a monovinyl substituted aromatic compound and acrylonitrile is blended with at least one rubbery block copolymer formed from at least one conjugated diene and at least one monovinyl substituted aromatic compound, and the blend is mixed with at least one peroxy oxygen containing material and the resulting mixture is subjected to a temperature sufficient to decompose the peroxy oxygen containing material.

Further according to this invention, even better results are obtained when in addition to the monovinyl substituted aromatic compound/acrylonitrile copolymer and the rubbery block copolymer, there is also blended therewith at least one resinous block copolymer formed from at least one conjugated diene and at least one monovinyl substituted aromatic compound.

Further according to this invention, part of the monovinyl substituted aromatic compound/acrylonitrile copolymer can be replaced with a homopolymer of a monovinyl substituted aromatic such as polystyrene.

Accordingly, it is an object of this invention to provide a new and improved method for making resinous compositions, more specifically monovinyl substituted aromatic compound/acrylonitrile copolymer compositions, more preferably styrene/acrylonitrile copolymer compositions. It is another object of this invention to provide a new and improved resinous composition, preferably monovinyl substituted aromatic compound/acrylonitrile copolymer containing composoitions, more preferably styrene/acrylonitrile copolymer containing compositions.

Other aspects, objects, and the several advantages of this invention will be apparent to those skilled in the art from the description and appended claims.

According to this invention, there is provided a method for making resinous compositions which comprises blending (1) at least one monovinyl substituted aromatic compound/acrylonitrile copolymer containing from about 5 to about 15 weight percent acrylonitrile based on the weight of the copolymer, the copolymer being present in an amount of from about 40 to about 95, preferably from about 60 to about 90, weight percent based on the total weight of the blend, (2) at least one rubbery block copolymer formed from at least one conjugated diene and at least one monovinyl substituted aromatic compound, the rubbery block copolymer being present in an amount of from about 4.5 to about 39.5, preferably from about 9 to about 30, weight percent based on the total weight of the blend, (3) at least one resinous block copolymer of at least one monovinyl substituted aromatic compound and at least one conjugated diene, the copolymer being present in an amount of from 0 to about 25, preferably from about 0.5 to about 20, weight percent based upon the total weight of the blend, and (4) at least one peroxy oxygen containing material; and then subjecting the peroxy oxygen containing blend to a temperature sufficient to decompose the peroxy oxygen containing material. The blend can be subjected to heating either during blending of the materials or after blending of the materials or both, at a temperature at or above that which causes decomposition of the peroxy oxygen containing material or materials.

Optionally, part of the monovinyl substituted aromatic compound/acrylonitrile copolymer can be replaced with a small but finite amount up to about 10 weight percent, e.g. 0.001 to 10 weight percent, homopolymer of monovinyl substituted aromatic, preferably polystyrene, the weight percent being based on the total weight of the polymer blend.

The monovinyl substituted aromatic compound/acrylonitrile resins used in this invention are generally available commercially and can be prepared by any method known in the art. These resins can be uniform or heterogeneous in composition depending upon their method of preparation. For example, the acrylonitrile content can vary as the polymerization proceeds. The monomer sequence in the polymer molecules of the resins can be random or nonrandom, homopolymer blocks of the monovinyl substituted aromatic compound being formed in the latter case. Two or more of these resins can be employed with or without replacement of some of the resins with one or more homopolymers of monovinyl substituted aromatic compounds. Any general purpose homopolymer of monovinyl substituted armatic compound can be used, for example, any commercially available, general purpose polystyrene. It is important that the amount of acrylonitrile be controlled in order that the acrylonitrile content in the acrylonitrile resins employed be in the range of from about 5 to about 15 weight percent based on the total weight of the acrylonitrile copolymer or copolymers present.

The rubbery and resinous block copolymers which are blended with the acrylonitrile containing copolymer are generally available commercially and can be prepared by any method known in the art. The block copolymers are formed by solution polymerization techniques so that the block structure is characterized in that the molecules of the final polymer product are composed of contiguous blocks, or segments, of different polymeric types, for example, one of the blocks forming the polymer chain can be a homopolymer of a conjugated diene or copolymer of a conjugated diene and a monovinyl substituted aromatic compound while an adjacent block in that same chain can be a homopolymer of a monovinyl substituted aromatic compound or copolymer of a monovinyl substituted aromatic compound and a conjugated diene. It should be noted that one or more conjugated diene or monovinyl substituted aromatic copolymer blocks can be present in the block copolymers used in this invention.

The rubbery block copolymer of this invention contains from about 40 to about 95, preferably from about 50 to about 95, weight percent conjugated diene based on the total weight of the monomers employed to make the block copolymer and from about 5 to about 60, preferably from about 5 to about 50, weight percent monovinyl substituted aromatic compound based upon the total weight of the monomers employed to make the block copolymer. The conjugated diene block of the rubbery block copolymer contains at least 50 weight percent conjugated diene based upon the total weight of the conjugated diene block. The monovinyl substituted aromatic block of the rubbery block copolymer is resinous and preferably a homopolymer of a monovinyl substituted aromatic compound but can be a copolymer which contains at least 80 weight percent monovinyl substituted aromatic compound based on the total weight of the monovinyl substituted aromatic block. The rubbery block copolymer contains from about 5 to about 75 weight percent of the monovinyl substituted aromatic block based on the total weight of the rubbery block copolymer.

The resinous block copolymer contains from about 50 to about 98, preferably from about 70 to about 90, weight percent monovinyl substituted aromatic compound or compounds, the remainder being conjugated dienes. The monovinyl substituted aromatic block of the resinous block copolymer is preferably a homopolymer of a monovinyl substituted aromatic compound but can be a copolymer of a monovinyl substituted aromatic compound and a conjugated diene containing at least 90 weight percent monovinyl substituted aromatic based upon the total weight of the monovinyl substituted aromatic block. The conjugated diene blocks of the resinous block copolymer contains at least 50 weight percent conjugated diene based upon the weight of the conjugated diene block.

The amount of homopolymer of monovinyl substituted aromatic compound present in any of the copolymers employed in this invention can be determined by the oxidative degradation test which is based upon the principle that polymer molecules containing ethylenic bonds when dissolved in p-dichlorobenzene and toluene can be broken into fragments by reaction with tert-butyl hydroperoxide catalyzed with osmium tetroxide. Saturated polymer molecules or molecular fragments such as polystyrene or the polystyrene units in block copolymers containing no ethylenic bonds remain unattacked. The small fragments (low molecular weight aldehydes) and the low molecular weight polystyrene fragments from a random copolymer block are soluble in ethyl alcohol whereas the unattacked high molecular weight polystyrene from the styrene homopolymer block is insoluble in ethyl alcohol. It is thus possible to effect a separation of the high molecular weight polystyrene which constitutes the homopolymer block of the block copolymer.

The conjugated dienes that can be employed in preparing the copolymers applicable to this invention are those containing from 4 to 10 carbon atoms per molecule, for example, 1,3 - butadiene, isoprene, 1,3 - pentadiene (piperylene), 1,3-hexadiene, 2,3-dimethyl-1,3-butadiene, 1,3-octadiene, 4-ethyl-1,3-hexadiene, 1-phenyl-1,3-butadiene, and the like. Preferred conjugated dienes are butadiene, isoprene, and piperylene.

Monovinyl substituted aromatic compounds that can be employed for preparing the copolymers of this invention are those containing from 8 to 12 carbon atoms per molecule, for example, styrene, 3-methylstyrene, 4-methylstyrene, 4-isopropylstyrene, 2,4-dimethylstyrene, 1-vinylnaphthalene, 2-vinylnaphthalene, and the like.

Solution-polymerized copolymers having block distribution of the monomers in the copolymer chain can be formed by polymerizing a first monomer in the presence of an organolithium catalyst to form a homopolymer, and subsequently adding a second monomer to the polymerization zone and continuing the polymerization operation. Block copolymers can also be formed by contacting a mixture of the selected conjugated diene and monovinyl substituted aromatic compound with an organolithium catalyst in the presence of a hydrocarbon diluent selected from the group consisting of aromatic, paraffinic and cycloparaffinic hydrocarbons. The polymerization is generally carried out at a temperature within the range of from about $-20$ to about 150, preferably from about $-10$ to about 80° C. and at pressures sufficient to maintain the materials present substantially in the liquid phase. The pressure will depend upon, inter alia, the particular materials being polymerized, the diluent being employed, and the temperature at which the polymerization is carried out. Pressures higher than autogenous can be employed if desired by the use of any suitable method such as the pressurization of the reactor with an inert gas.

The organolithium compounds generally used correspond to the formula $R(Li)_x$ wherein R is a hydrocarbon radical selected from the group consisting of aliphatic, cycloaliphatic and aromatic radicals and combinations thereof and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,4-dilithionaphthalene, 1,2-dilithio-1,3-diphenylethane, 9,10-dilithio-9,10-dihydroanthracene, 1,2-dilithio-1,3-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10, 20-tetralithioeicosane, 1,2,4,6-tetralithiocyclohexane, 1,2, 3,5-tetralithio-4-hexylanthracene, 1,3 - dilithio-4-cyclohexane, and the like.

Catalysts other than hydrocarbon-lithium compounds can be used to prepare the polymers of this invention. For example, the catalysts disclosed in U.S. Patent 3,215,679, the disclosure of which is hereby incorporated herein by reference, can be used in lieu of hydrocarbon-lithium catalysts.

The amount of catalyst used in the preparation of block copolymers can vary over a wide range but will generally be at least 0.05 part by weight of the organolithium compound per 100 parts by weight of the total monomers to be polymerized in the process. The upper limit for the amount of organolithium used depends primarily upon catalyst solubility and the desired inherent viscosity of the polymer resulting from the polymerization. A preferred effective catalyst level is from about 0.1 to about 2 parts by weight of organolithium per 100 parts by weight of total monomers charged to the polymerization zone.

The hydrocarbon diluent employed can vary widely but is preferably a hydrocarbon of one of the above-mentioned types containing from 3 to 12, inclusive, carbon atoms. Examples of such diluents include propane n-butane, isobutane, n-pentane, n-hexane, n-decane, n-dodecane, cyclohexane, cyclopentae, methylcyclohexane, benzene, toluene, xylene, and the like. Mixtures of two or more of these hydrocarbons can be employed.

Block copolymers prepared by using an organomonolithium initiator can be treated with a polyfunctional agent to terminate the polymerization and couple together two or more block copolymers.

Suitable methods of making block copolymers can be found in U.S. Patent 3,030,346, the disclosure of which is incorporated herein by reference. Other suitable methods of making block copolymers as well as random copolymers utilizable in this invention are found in U.S. Patent 2,975,160, the disclosure of which is incorporated herein by reference.

At the completion of the above polymerization reactions the reaction mixture is inactivated by the addition of one or more conventional catalyst-inactivating materials such as water, alcohols, organic and inorganic acids, and the like. Also, suitable additives such as antioxidants, stabilizers, pigments and the like can be added to the copolymer product.

The peroxy compounds which can be employed in this invention include organic and inorganic peroxides. The term "organic peroxides" is meant to include the hydroperoxides, unless otherwise stated, and to encompass compounds containing from 4 to 40 carbon atoms per molecule, inclusive. The organic peroxides can also be substituted with non-peroxy members such as halogen, hydroxy radicals, ether and/or ester linkages, and the like. The inorganic peroxides include calcium peroxide, barium peroxide, zinc peroxide, lead peroxide, and mixtures thereof.

Examples of suitable peroxides include: methyl n-propyl peroxide, diethyl peroxide, ethyl isopropyl peroxide, di-tert-butyl peroxide, di-n-hexyl peroxide, n-hexyl n-decyl peroxide, dieicosyl peroxide, dicyclohexyl peroxide, dicyclopentyl peroxide, bis(2,4,6-trimethylcyclohexyl) peroxide, bis(3,5 - dichlorocyclohexyl) peroxide, bis(4 - phenylcyclohexyl) peroxide, bis(2 - cyclohexenyl) peroxide, bis(4 - methyl - 2 - hexenyl) peroxide, bis(4 - octenyl) peroxide, dipropionyl peroxide, dilauroyl peroxide, dibenzoyl peroxide, dicrotonyl peroxide, dibenzyl peroxide, dicumyl peroxide, methyl 2-n-propyl 3 - butenyl peroxide bis(alpha-ethylbenzyl) peroxide, bis[diisopropyl(4 - isopropylphenyl)methyl] peroxide, bis[dimethyl - (4 - tert - butylphenyl)methyl] peroxide, benzyl alpha - methylbenzyl peroxide, bis[(4-chlorobenzoyl)] peroxide, bis(2,4-dichlorobenzoyl) peroxide, bis(2-propxy-n-hexyl) peroxide, n-pentyl 5,8-diphenyldodecyl peroxide, bis(9,10 - dihydroxydecyl) peroxide, 2,5 - di(tert-butylperoxy) - 2,5-dimethylhexane, bis(2-hydroxyheptyl) peroxide, tertbutyl hydroperoxide, dodecyl hydroperoxide, eicosyl hydroperoxide, triacontanyl hydroperoxide, 4 - methylcyclohexyl hydroperoxide, phenylcyclohexane hydroperoxide, 3 - cyclohexenyl hydroperoxide, 3 - phenyl-2-cyclohexenyl hydroperoxide, 4-cyclopentyl-n-butyl hydroperoxide, cumene hydroperoxide (dimethylphenylhydroperoxymethane), diisopropylbenzene hydroperoxide [dimethyl - (4-isopropylphenyl) hydroperoxymethane], (4 - ethoxyphenyl)methyl hydroperoxide, di - n - hexyl - 4 - hydroxyphenylhydroperoxymethane, dimethyl(3 - methoxyphenyl)hydroperoxymethane, peroxybenzoic acid, peroxybutyric acid, peroxydodecanoic acid, tert-butyl peroxybenzoate, di-tert-amyl diperoxyphthalate, and tert-dodecyl peroxyacetate.

Peroxides formed by the oxidation of terpene hydrocarbons such as pinane, alpha-pinene, p-methane, and turpentine can also be used.

The peroxides which are preferred in this invention are those which decompose at a temperature of at least 250° F. The upper maximum decomposition temperature is dictated primarily by practicality rather than functionality, i.e. it should be such that substantially complete decomposition of the peroxide occurs during preparation of the composition. The amount of peroxy compound or compounds employed according to this invention is that which will provide from about 0.25 to about 6, preferably from about 0.35 to about 4.5, gram millimoles of peroxy oxygen (—O—O—) per 100 grams of conjugated diene in the above-described copolymer or copolymers.

The polystyrene, rubbery polymer, high styrene block copolymer, and peroxy compound or compounds can be mixed or blended in any conventional manner, a primary desired result being an intimate mixture of the components. It is presently preferred that the mixing, when the peroxy compound is present, be carried out in the substantial absence of air in order to effect maximum property improvement. However, it does not appear at present to be mandatory that substantially all air be excluded, for example, satisfactory results can be obtained by Banbury mixing if the Banbury is merely substantially full. Generally, any internal mixer such as a Banbury, twin screw extruder, Brabender Plastograph, and the like can be employed. Mixing in a vacuum or an inert atmosphere such as nitrogen can also be advantageously employed in this invention. It should be noted that various blending techniques can be employed, e.g. blending only a portion of one or more components, preferably all the rubber components and a portion of the polystyrene, in a first mixing cycle and then adding the remainder of those one or more components, such as the remainder of the polystyrene, for additional mixing in a second mixing cycle.

Although the mixing temperature when the peroxy compound is present in the mix is that sufficient to substantially decompose the peroxy compound, in general, the mixing temperature will most times fall in the range of from about 250 to about 600, preferably from about 300 to about 500° F. The mixing time, as with the mixing temperature, can vary widely but will generally be in the range of from about 1 to about 30, preferably from about 2 to about 15, minutes. The blend can also be heated to similar temperatures after mixing is terminated or the heating operation can overlap the mixing period and the period following the termination of the mixing operation.

The blends of this invention can also contain other ingredients normally included in such compounds. For example, antioxidants, pigments, dyes, fillers, stabilizers, plasticizers, foaming agents, and the like can be included in these blends.

EXAMPLE I

The long term load bearing properties of several resins, i.e. the 100 hour breaking stresses of dumbbell specimens coated with vegetable oil or fat, were determined. A resin prepared according to the invention was tested along with a general purpose polystyrene (Cosden 550, manufactured by Cosden Oil and Chemical Company), a commercial high impact polystyrene ("Styron 475," manufactured by the Dow Chemical Company), a commercial ABS resin (acrylonitrile/butadiene/syrene resin, Tibrene 217, manufactured by the Dow Chemical Company), and a resin composition prepared from a general purpose polystyrene (Cosden 550), a rubbery butadiene/ styrene block copolymer, a resinous styrene/butadiene block copolymer, and an organic peroxy compound.

The resin of the invention, and also that prepared from Cosden 550 and the rubbery and resinous block copolymers, were high impact materials with high tensile strength and high elongation. The resin of the invention was prepared by blending a styrene/acrylonitrile resin containing 8.75 weight percent acrylonitrile, a rubbery 75/25 butadiene/styrene block copolymer, and a resinous 88/12 styrene/butadiene block copolymer, and thereafter adding 2,5 - bis(tert-butylperoxy) - 2,5-dimethylhexane (obtained as a 50 weight percent active material sold under the trade name of Varox and manufactured by R. T. Vanderbilt Company), and heating the mixture.

The other composition contained Cosden 550 instead of the styrene/acrylonitrile resin.

The blending for both resins was conducted in an internal mixer (Brabender Plastograph). The chamber was flushed with nitrogen, the styrene/acrylonitrile resin, or the Cosden 550, and the resinous 88/12 styrene/ butadiene block copolymer were introduced and mixed at slow speed until fluxing occurred. The rubbery 75/25 butadiene/styrene block copolymer was added and the materials were mixed 3 minutes under nitrogen with the mixer operating at 100 r.p.m. The peroxide was then added, the vacuum head closed, and the chamber was evacuated. Mixing was continued at 100 r.p.m. for 7 minutes. The initial mixing temperature, after addition of the peroxide, for the composition prepared according to the invention was 163° C. and the final temperature was 188° C. Corresponding temperatures for the composition containing the polystyrene (Cosden 550) were 155° C. and 180° C., respectively.

After removing the blends from the mixer, they were compression molded at 350° F. into sheets ⅟₁₆ inch in thickness. The sheets were cut into ½ inch strips from which dumbell specimens were machine. A 2 inch gage length was used for the test specimens and the width in the gage length area was ¼ inch. Tensile strength and elongation were measured at a drawing rate of 0.2 inch per minute following the procedure of ASTM D–638–61T. Izod impact strength was also measured following the procedure of ASTM D–258–54T. The quantities of polymeric material and peroxide used in the blend and physical properties of the compositions were as follows:

The polymer was analyzed for nitrogen and a value of 2.31 weight percent was obtained. The acrylonitrile content calculated from the nitrogen analysis was 8.75 weight percent. The polymer had a melt flow of 0.15 (ASTM D1238–62T, 200° C., 5 kg).

The rubbery 75/25 butadiene/styrene block copolymer was prepared in n-hexane diluent using 2.6 gram millimoles of n-butyllithium per 100 grams of monomer as the initiator. All ingredients were charged initially. Polymerization was initiated at about 150° F. and the temperature increased to about 220° F. during the reaction. On completion of the polymerization, one part by weight per 100 parts rubber of a mixture of $C_{16}$ to $C_{18}$ saturated and unsaturated fatty acids was added to inactivate the catalyst and one part by weight per 100 parts rubber of 2,6-di-tert-butyl-4-methylphenol was added as antioxidant. The mixture was steam stripped and the wet rubber crumb was washed and dried. The copolymer had a Mooney value (ML–4 at 212° F.) of about 47.

The resinous 88/12 styrene/butadiene block copolymer was prepared in accordance with the following recipe:

| | |
|---|---|
| 1,3-butadiene, parts by weight | 12 |
| Styrene, parts by weight | 88 |
| Cyclohexane, parts by weight | 1000 |
| n-butyllithium, mhm.[1] | 1.05 |
| Temperature, ° F. | 158 |
| Time, hours | 18 |
| Conversion, percent | 100 |

[1] Mhm.=gram millimoles per 100 grams of monomers.

All recipe ingredients were charged initially. The polymerization was conducted in an atmosphere of nitrogen. At the conclusion of the polymerization the reaction was shortstopped with an isopropyl alcohol solution containing one part by weight per 100 weight parts polymer of tris-nonylphenyl phosphite and two parts by weight per 100 weight parts polymer of thio-bis phenol. The polymer was coagulated in isopropyl alcohol, separated, and dried.

Samples of the resin compositions described above, a general purpose polystyrene (Cosden 550), and a high impact polystyrene ("Styron 475") were prepared for the purpose of determining the 100 hour breaking stress. Values were obtained on uncoated samples and samples coated with a vegetable oil (Mazola) and a highly unsatu-

| | | |
|---|---|---|
| Styrene/acrylonitrile resin, parts by weight | 70 | |
| General purpose polystyrene (Cosden 550), parts by weight | | 70.8 |
| 75/25 butadiene/styrene block copolymer (rubber), parts by weight | 25 | 24.2 |
| 88/12 styrene/butadiene block copolymer (resin), parts by weight | 5 | 5 |
| Acrylonitrile contributed by 70 parts styrene/acrylonitrile resin, parts by weight based on total weight of polymers in blend | 6.1 | |
| Conjugated diene contributed by 5 parts 88/12 styrene/butadiene copolymer, parts by weight based on total weight of polymers in blend | 0.6 | 0.6 |
| Rubber content of composition, wt. percent based on total weight of polymers in blend | 25.6 | 24.8 |
| Varox, wt. percent based on total weight of polymers in blend | 0.075 | 0.07 |
| Gram millimoles peroxy oxygen per 100 grams rubber in composition | 2 | 1.9 |
| Tensile, p.s.i. (yield) | 3,240 | 3,440 |
| Elongation, percent | 47.5 | 51 |
| Notched Izod impact, ft. lbs./in | 6.37 | 5.4 |

The following recipe was employed for the preparation of the styrene/acrylonitrile resin:

| | Parts by wt. |
|---|---|
| Styrene | 95 |
| Acrylonitrile | 5 |
| Water | 210 |
| "Santomerse 85"[1] | 2 |
| Sodium bisulfite | 0.01 |
| Potassium persulfate | 0.3 |
| Temperature, °C. | 50 |
| Conversion, percent | 100 |
| Shortstop: "Thiostop N"[2] | 0.15 |

[1] An alkyl aryl sulfonate.
[2] Sodium dimethyldithiocarbamate.

rated vegetable shortening (Crisco). The test specimens were thin dumbells which were machined from compression molded sheets. Typical dimensions of the necked down portion were one inch length by 0.230–0.250 inch width by 0.005–0.020 inch thickness. The samples were clamped to the lids of 3.5-inch internal diameter stainless steel tubes and the correct weight to give a predetermined stress was clamped to the other end of the sample. The stainless steel tubes were provided with micro switches in the bottom. A clock connected to the micro switch was started at the time the weight was attached to the test specimen. When the sample broke, the falling weight tripped the micro switch which stopped the clock and recorded the time to rupture. The tests were conducted at room temperature in air. Results of the 100 hour breaking stress tests were as follows:

TABLE I

| Resin | Uncoated, p.s.i. | Coated, p.s.i. | Retention in breaking stress of coated sample, percent | Coating material |
|---|---|---|---|---|
| (1) Prepared according to invention | 2,250 | 750 | 33.3 | Mazola.[1] |
| (2) Cosden 550/rubbery block copolymer/resinous block copolymer | 1,850 | 400 | 21.6 | Crisco. |
| (3) Cosden 550 | 1,700 | 300 | 17.6 | Do. |
| (4) "Styron 475" | 1,600 | 350 | 21.9 | Do. |
| (5) Tybrene 217 | 2,600 | 600 | 23.1 | Crisco and Mazola.[1] |

[1] Results are the same on samples coated with either Crisco or Mazola.

These data show the resin prepared according to this invention was substantially more resistant to the action of oil than the other compositions in that resin 1 of Table I had a substantially greater retention in breaking stress than any of resins 2 through 5 of Table I. It should be noted that not only was the resin of run 1 of Table I more oil resistant than commercial resins including the commercial acrylonitrile/butadiene/styrene resin (run 5) but also of resin 2 which was prepared in substantially an identical manner as resin 1 except that resin 1 contained 6.1 weight percent acrylonitrile based on the total weight of the polymers in the blend.

EXAMPLE II

A resin composition was prepared from a styrene/acrylonitrile resin, rubbery 75/25 butadiene/styrene block copolymer, a resinous 75/25 styrene/butadiene block copolymer, and bis($\alpha,\alpha$-dimethylbenzyl) peroxide.

The styrene/acrylonitrile resin was prepared by emulsion polymerization using a styrene/acrylonitrile weight ratio of 92.5 to 7.5. The recipe was as follows:

| | Parts by wt. |
|---|---|
| Styrene | 92.5 |
| Acrylonitrile | 7.5 |
| Water | 180 |
| Santomerse 85 [1] | 2 |
| Sodium hydroxide | 0.2 |
| Sodium disulfite | 0.01 |
| Potassium persulfate | 0.3 |
| Blend of $C_{12}$, $C_{14}$, and $C_{16}$ tertiary mercaptans | 0.3 |
| Temperature, °C. | 49–52 |
| Conversion, percent | 80 |
| Shortstop: "Thiostop N [1]" | 0.1 |

[1] Sodium dimethyldithiocarbamate.

This polymer had a melt flow of 2.8, indicative of a much lower molecular weight material than the styrene/acrylonitrile resin of Example I. The acrylonitrile content, calculated from nitrogen analysis, was 7.19 weight percent based on the total weight of the copolymer.

The rubbery 75/25 butadiene/styrene block copolymer was the same as that of Example I.

The resinous block copolymer was prepared using the following recipe:

| | |
|---|---|
| 1,3-butadiene, parts by weight | 25 |
| Styrene, parts by weight | 75 |
| Cyclohexane, parts by weight | 1000 |
| n-Butyllithium, mhm | 0.08 |
| Temperature, °F.: | |
| Initiation | 180 |
| Peak | 220 |
| Conversion, percent | 100 |

All recipe ingredients were charged initially. The polymerization was conducted in an atmosphere of nitrogen. On completion of the polymerization, one part by weight per 100 parts by weight copolymer of a mixture of $C_{16}$ to $C_{18}$ saturated and unsaturated fatty acids was added to inactivate the catalyst and a mixture of one part by weight per 100 parts of copolymer of a phosphinated polyalkyl polyphenol and 0.1 part by weight of dilaurylthiodipropionate was added as antioxidant. The mixture was steam stripped to recover the product.

The procedure of Example I was followed in preparing the composition concerning blending, heating, and the like as well as in preparing the test specimens from the prepared composition. The following are the amounts of the several materials employed and the properties of the final prepared composition:

| | |
|---|---|
| Styrene/acrylonitrile resin, parts by weight [1] | 71.6 |
| 75/25 Butadiene/styrene block copolymer (rubber), parts by weight [1] | 23.4 |
| 75/25 Styrene/butadiene block copolymer (resin), parts by weight [1] | 5 |
| Acrylonitrile contributed by styrene/acrylonitrile resin, parts by weight [1] | 5.1 |
| Conjugated diene contributed by high styrene block copolymer, parts by weight [1] | 1.2 |
| Rubber content of composition, wt. percent [2] | 24.6 |
| Bis($\alpha,\alpha$-dimethylbenzyl) peroxide, wt. percent [2] | 0.075 |
| Grams millimoles peroxy oxygen per 100 grams rubber in composition | 1.1 |
| Tensile, p.s.i. [3] | 3090 |
| Elongation, percent [3] | 65 |
| Notched Izod impact, ft. lbs./in. [3] | 5.58 |

[1,2] Parts by weight and weight percent based on total weight of polymers in blend.
[3] Same test procedures as Example I.

These results show that the resin composition had high tensile strength, high elongation, and high impact strength.

The 100 hour breaking stress of an uncoated sample and a sample coated with Crisco was determined on the composition using the procedure of Example I. Results were as follows:

| | |
|---|---|
| Uncoated sample, p.s.i. | 1500 |
| Coated sample, p.s.i. | 550 |
| Retention in breaking stress of coated sample, percent | 36.7 |

These results show that the resin was much more resistant to the action of vegetable fat than were the control resins (resins 2 through 5, Table I) of Example I in that a substantially greater retention in breaking stress was realized.

EXAMPLE III

The following three styrene/acrylonitrile resins were employed as components for preparing compositions according to this invention:

| Resin: | Acrylonitrile, wt. percent |
|---|---|
| A | 10.76 |
| B | 5.68 |
| C | 15.97 |

Two compositions were prepared, designated as 1 and 2, using a mixture of the three styrene/acrylonitrile resins, the rubber 75/25 butadiene/styrene block copolymer described in Example I, and the resinous 75/25 styrene/ butadiene block copolymer described in Example II. In addition, a general purpose polystyrene (Cosden 550) was added to composition 2. The peroxy compound employed was bis($\alpha,\alpha$-dimethylbenzyl) peroxide. The blending of the polymers, incorporation of the peroxy compound, and preparation of samples for testing were the same as in Example I. The amounts of the several materials employed and the properties of the resin compositions were as follows:

|  | 1 | 2 |
|---|---|---|
| Styrene/acrylonitrile resins, parts by weight:[1] |  |  |
| 90/10 resin | 35.8 | 32.2 |
| 95/5 resin | 23.1 | 20.7 |
| 80/20 resin | 12.7 | 11.5 |
| 75/25 butadiene/styrene block copolymer (rubber), parts by weight[1] | 23.4 | 23.4 |
| 75/25 styrene/butadiene block copolymer (resin), parts by weight[1] | 5 | 5 |
| General purpose polystyrene (Cosden 550), parts by weight[2] | ---- | 7.2 |
| Acrylonitrile contributed by styrene/acrylonitrile resins, parts by weight:[2] |  |  |
| A resin | 3.85 | 3.46 |
| B resin | 1.31 | 1.18 |
| C resin | 2.54 | 2.30 |
| Total acrylonitrile contributed by styrene/acrylonitrile resins, parts by weight[2] | 7.70 | 6.94 |
| Conjugated diene contributed by high styrene block copolymer, parts by weight[2] | 1.2 | 1.2 |
| Rubber content of composition | 24.6 | 24.6 |
| Bis($\alpha,\alpha$)-dimethylbenzyl) peroxide, wt. percent[1] | 0.075 | 0.075 |
| Gram millimoles peroxy oxygen per 100 grams rubber in composition | 1.1 | 1.1 |
| Tensile, p.s.i.[3] | 2,590 | 2,650 |
| Elongation, percent[3] | 37.5 | 26 |
| Notched Izod impact, ft. lbs./in.[3] | 6.43 | 5.99 |

[1] and [2] Parts by weight and weight percent based on total weight of polymers in blend.
[3] Same test procedures as Example I.

These data show that the resins of this invention that have high tensile strength, high elongation, and high impact strength can be prepared using mixtures of styrene/acrylonitrile resins. The data also show that polystyrene can be employed as an ingredient in the compositions of this invention.

The 100 hour breaking stress of uncoated samples and samples coated with Crisco was determined on each of compositions 1 and 2 using the procedure of Example I. Results were as follows:

TABLE II

|  | Uncoated, p.s.i. | Coated, p.s.i. | Retention in breaking stress of coated samples, percent |
|---|---|---|---|
| Composition 1 | 1,500 | 600 | 40.0 |
| Composition 2 | 1,250 | 625 | 50.0 |

These data demonstrate again that the resins of the invention are much more resistant to the action of oily material than the control resins (resins 2 through 5, Table I) of Example I in that a substantially greater retention in breaking stress was realized.

EXAMPLE IV

A resin composition was prepared from a styrene/acrylonitrile resin, a rubbery 75/25 butadiene/styrene block copolymer, and bis($\alpha,\alpha$-dimethylbenzyl) peroxide. These components were the same as the corresponding components of Example II.

No resinous styrene/butadiene block copolymer was employed in this composition.

Blending of the polymers, incorporation of the peroxy compound, heating of the blend, and preparation of the samples for testing were the same as in Example I. The amounts of materials utilized and properties of the resin composition were as follows:

Styrene/acrylonitrile resin, parts by weight[1] ----- 75
75/25 butadiene/styrene block copolymer, parts by weight[1] ----- 25
Acrylonitrile contributed by styrene/acrylonitrile resin, parts by weight[1] ----- 5.4
Bis($\alpha,\alpha$-dimethylbenzyl) peroxide, wt. percent[2] -- 0.075
Gram millimoles peroxy oxygen per 100 grams rubber in composition ----- 1.1
Tensile, p.s.i.[3] ----- 2780
Elongation, percent[3] ----- 30
Notched Izod impact, ft. lbs./in.[3] ----- 1.65

[1-2] Parts by weight and wt. percent based on total weight of polymers in blend.
[3] Same test procedures as Example I.

In addition to the foregoing tests on physical properties, determinations were made on the 100 hour breaking stress of an uncoated sample and a sample coated with Crisco using the procedure of Example I. Results were as follows:

TABLE III

| Uncoated, p.s.i. | Coated, p.s.i. | Retention in breaking stress of coated sample, percent |
|---|---|---|
| 1,750 | 425 | 24.3 |

The above data show that resinous compositions with good properties can be prepared from a styrene/acrylonitrile resin and a rubbery butadiene/styrene block copolymer and without the presence of a resinous block copolymer.

EXAMPLE V

Two compositions were prepared, with and without a peroxy oxygen containing material, using the styrene/acrylonitrile resin, the rubbery butadiene/styrene block copolymer, and the resinous styrene/butadiene block copolymer of Example II in the same manner as Example II.

Two additional compositions were prepared employing the styrene/acrylonitrile resin of Example II, a butadiene/styrene emulsion copolymer, and a styrene/butadiene graft copolymer.

The rubbery emulsion copolymer of butadiene and styrene was prepared by emulsion polymerization at 41° F. and had a bound styrene content of about 23.5 weight percent (SBR 1500).

The resinous graft copolymer was composed of polystyrene grafted onto polybutadiene latex.

The polybutadiene latex employed for preparing the graft copolymer resin was prepared according to the following emulsion polymerization recipe:

| | Parts by wt., based on total wt. of monomer in recipe |
|---|---|
| 1,3-butadiene | 100 |
| Water | 210 |
| "Aerosol MA80"[1] | 4.0 |
| "Aerosol 22"[2] | 2.92 |
| Mixed tertiary mercaptans | 0.2 |
| NaHSO$_3$ | 0.01 |
| K$_2$S$_2$O$_8$ | 0.5 |
| KOH | 0.25 |

[1] Dihexyl sodium sulfosuccinate.
[2] Tetrasodium N-(1,2-dicarboxyethyl) - N - octadecylsulfosuccinate.

Polymerization was continued to quantitative conversion of butadiene.

The latex had a final solids content of 33.8 weight percent (theoretical solids was 33.9 wt. percent) based on the total weight of the latex, and 95.2 weight percent of the total solids was polybutadiene.

The graft copolymer was prepared in accordance with the following recipe:

| | Grams |
|---|---|
| Polybutadiene latex (25 g. polybutadiene) | 77.6 |
| "Dresinate 554"[1] | 1.7 |
| KOH | 0.3 |
| K$_2$S$_2$O$_8$ | 0.25 |
| NaHSO$_3$ | 0.05 |
| Styrene | 75 |
| Mixed tertiary mercaptans | 0.3 |
| Water | 220 |
| Final solids, wt. percent based on the graft copolymer latex | 26.6 |

Composition: 76/24 (polystyrene/polybutadiene).

[1] Rosin soap emulsifier.

Of the two compositions employing rubbery emulsion and resinous graft copolymers, one was treated with peroxide while the other was not.

The mixing of all the compositions and the treating of two of the compositions with peroxy oxygen containing material carried out in the same manner as set forth in Example II. The results were as follows:

| | Invention | | Prior Art | |
|---|---|---|---|---|
| | 1 | 2 | 3 | 4 |
| Styrene/acrylonitrile resin, parts by weight[1] | 71.6 | 71.6 | 71.6 | 71.6 |
| 75/25 butadiene/styrene block copolymer (rubber), parts by weight[1] | 23.4 | 23.4 | | |
| 75/25 styrene/butadiene block copolymer (resin), parts by weight[1] | 5 | 5 | | |
| Butadiene/styrene emulsion copolymer (rubber), parts by weight[1] | | | 23.4 | 23.4 |
| 76/24 styrene/butadiene graft copolymer (resin), parts by weight[1] | | | 5 | 5 |
| Bis($\alpha,\alpha$-dimethylbenzyl) peroxide, wt. percent[2] | 0.075 | 0 | 0.075 | 0 |
| Acrylonitrile contributed by styrene/acrylonitrile resin, parts by weight[1] | 5.1 | 5.1 | 5.1 | 5.1 |
| Conjugated diene in resinous styrene/butadiene copolymer, parts by weight[1] | 1.2 | 1.2 | 1.2 | 1.2 |
| Rubber content of composition, wt. percent[2] | 24.6 | 24.6 | 24.6 | 24.6 |
| Gram millimoles peroxy oxygen per 100 grams rubber in composition | 1.1 | 1.1 | 1.1 | 1.1 |
| Tensile, p.s.i.[3] | 3,060 | 1,280 | 3,340 | 3,450 |
| Elongation, percent[3] | 55 | 2.5 | 13 | 4 |
| Notched Izod impact, ft. lbs./in.[3] | 5.3 | 3.4 | 0.8 | 1.4 |

[1]–[2] Parts by weight and wt. percent based on total weight of polymers in blend.
[3] Same test procedures as Example I.

Run 1 was made in accordance with this invention and comparison of that run with run 2, which contained no peroxide treatment, shows that the peroxide treatment gives susbtantially improved tensile, elongation, and impact propertes.

Runs 3 and 4 were made wothout the use of the block copolymer of this invention and these runs contained greatly inferior elongation and impact strengths even with a peroxide treatment (run 3).

Reasonable variations and modifications are possible within the scope of this disclosure without departing from the spirit and scope thereof.

We claim:

1. A resinous composition of improved properties formed by blending (1) at least one monovinyl substituted aromatic hydrocarbon compound/acrylonitrile copolymer contianing from about 5 to about 15 weight percent acrylonitrile based on the total weight of the acrylonitrile containing copolymer, (2) at least one rubbery block copolymer formed from 40 to 95 weight percent of at least one conjugated diene and 5 to 60 weight percent of at least one monovinyl substituted aromatic hydrocarbon compound, based on the total weight of the rubbery copolymer, (3) from 0 to about 25 weight percent, based on the total weight of the polymer blend, of at least one resinous block copolymer formed from 70 to 90 weight percent based on the total weight of the resinous copolymer of at least one monovinyl substituted aromatic hydrocarbon compound, the remainder being at least one conjugated diene, and (4) at least one peroxy oxygen containing material in an amount sufficient to supply from about 0.25 to about 6 gram millimoles of peroxy oxygen per 100 grams of conjugated diene; and subjecting said blend to a temperature at least sufficient to decompose the peroxy oxygen containing material.

2. A composition according to claim 1 wherein said blend includes in lieu of part of the acrylonitrile containing copolymer a homopolymer of a monovinyl substituted aromatic compound, said homopolymer being present in an amount of from 0.001 to about 10 weight percent based on the total weight of the polymers in the blend.

3. A composition according to claim 1 wherein the blend contains from about 40 to about 95 weight percent of the acrylonitrile containing copolymer, from about 4.5 to about 39.5 weight percent rubbery block copolymer, and from about 0.5 to about 20 weight percent resinous block copolymer, all weight percents being based on the total weight of the polymers in the blend.

4. A composition according to claim 3 wherein the conjugated dienes in the blend contain from 4 to 10 carbon atoms per molecule, inclusive, and the monovinyl substituted aromatic compounds in the blend contain from 8 to 12 carbon atoms per molecule, inclusive.

5. A composition according to claim 3 wherein the rubbery block copolymer contains at least one block containing at least 50 weight percent conjugated diene based upon the total weight of the rubbery block and at least one monovinyl substituted aromatic, the weight percent being based upon the total weight of the monovinyl substituted aromatic compound block; and the resinous block copolymer contains at least one monovinyl substituted aromatic compound block containing at least 90 weight percent monovinyl substituted aromatic compound, the weight percent being based upon the weight of the monovinyl substituted aromatic compound block, and at least one conjugated diene block containing at least 50 weight percent conjugated diene, the weight percent being based upon the weight of the conjugated diene block, said peroxide being selected from the group consisting of 2,5-bis(tert-butylperoxy) - 2,5-dimethylhexane ane bis($\alpha,\alpha$-dimethylbenzyl) peroxide.

6. A composition according to claim 3 wherein the blend is heated to at least 250° F. during at least one of forming said blend and after said blend is formed.

7. A composition according to claim 3 wherein said acrylonitrile containing copolymer is a copolymer of styrene and acrylonitrile, said rubbery block copolymer is a copolymer of butadiene and styrene, said resinous block copolymer is a copolymer of styrene and butadiene, and the blend is heated to a temperature of at least 250° F. during at least one of forming said blend and after said blend is formed.

8. A composition according to claim 3 wherein said acrylonitrile containing copolymer is a copolymer of styrene and acrylonitrile, said rubbery block copolymer is a copolymer of isoprene and styrene, said resinous block copolymer is a copolymer of styrene and isoprene, and the blend is heated to a temperautre of at least 250° F. during at least one of forming said blend and after said blend is formed.

References Cited

UNITED STATES PATENTS

| | | | |
|---|---|---|---|
| 2,844,562 | 7/1958 | Ingram | 260—892 XR |
| 3,231,635 | 1/1966 | Holden et al. | |
| 3,359,345 | 12/1967 | Doak et al. | |

FOREIGN PATENTS

| | | |
|---|---|---|
| 1,025,295 | 4/1966 | Great Britain. |

MURRAY TILLMAN, Primary Examiner

K. E. KUFFNER, Assistant Examiner

U.S. Cl. X.R.

260—880, 893

UNITED STATES PATENT OFFICE
CERTIFICATE OF CORRECTION

Patent No. 3,491,166            Dated January 20, 1970

Inventor(s) Clifford W. Childers et al.

It is certified that error appears in the above-identified patent and that said Letters Patent are hereby corrected as shown below:

Claim 5, Column 14, line 74, after "aromatic" and before "," should be -- compound block containing at least 80 weight percent monovinyl substituted aromatic --.

Signed and sealed this 23rd day of June 1970.

(SEAL)
Attest:

EDWARD M. FLETCHER, JR.        WILLIAM E. SCHUYLER, JR.
Attesting Officer               Commissioner of Patents